Patented Feb. 27, 1923.

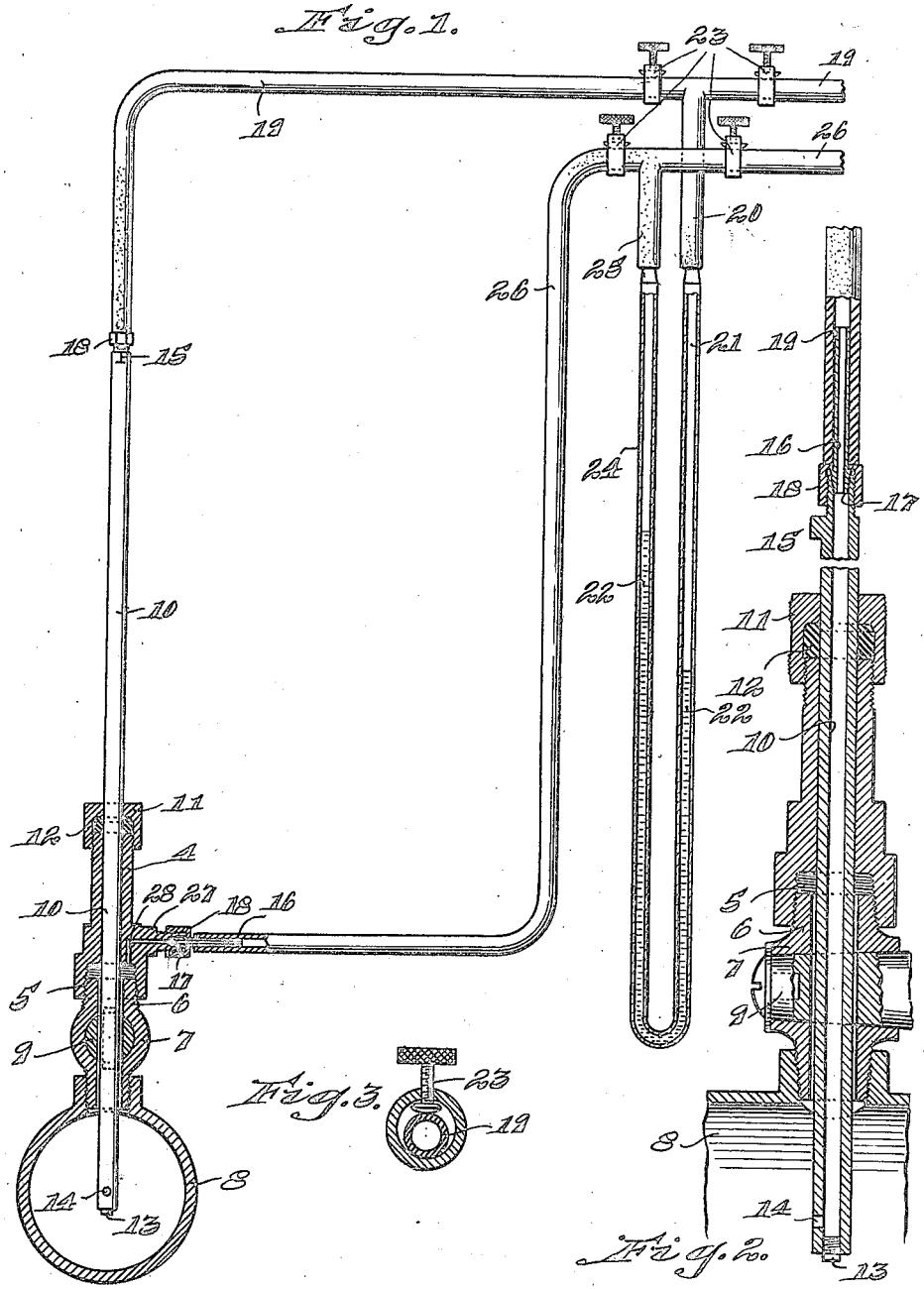

1,446,618

UNITED STATES PATENT OFFICE.

WILLIAM S. DARLEY, OF CHICAGO, ILLINOIS.

PITOMETER.

Application filed January 5, 1920. Serial No. 349,566.

*To all whom it may concern:*

Be it known that I, WILLIAM S. DARLEY, a citizen of the United States, and a resident of the city of Chicago, county of Cook, and State of Illinois, have invented certain new and useful Improvements in Pitometers, of which the following is a specification.

My invention relates to improvements in pitometers especially adapted for measuring and determining the velocity of flow of liquids in pipes, and has for its object the provision of an improved construction of this character which is simple and efficient in use, and capable of economical manufacture.

Other objects will appear hereinafter.

The invention consists in the combinations and arrangements of parts hereinafter described and claimed.

The invention will be best understood by reference to the accompanying drawings forming a part of this specification, and in which, Fig. 1, is a view showing a pitometer embodying the invention in position of use, Fig. 2, an enlarged section taken through the end or a current-testing or Pitot's tube employed in the construction, and Fig. 3, a detail view of one of a plurality of pinch cocks employed in the construction.

The preferred form of construction, as illustrated in the drawings, comprises a casing 4, provided at its lower end with a tapered threaded socket 5 adapted to fit the taper thread on the nipple 6 of an ordinary corporation cock 7 adapted and arranged to be secured in the side of the water main 8, as indicated. The corporation cock is provided with a rotatable core member 9, having a diametric perforation therein, adapted to permit the ready passage of a current-testing or Pitot's tube 10, as indicated. The arrangement is such, that a small chamber is formed in the casing 4 behind the end of the nipple 6, and the bore or opening extending through the corporation cock is somewhat larger than the outside diameter of the tube 10, whereby said chamber is placed in open communication with the interior of the pipe 8 through and at the periphery thereof, and whereby the static pressure in the pipe 8 will be freely transmitted into said chamber without complication from the flow of current in the pipe 8. At its upper end, the casing 4 carries a threaded cap 11 and a rubber gasket 12 is imprisoned therein, as shown, and whereby the tube 10 may be freely slid through the casing 4 and corporation cock 7 and locked in adjusted position, and the joint sealed to prevent the escape of water. At its inner end, the tube 10 is closed by a plug 13 and is provided with a current opening 14 in one side thereof, an indicator 15 being formed on the upper end of said tube in registration with the opening 14 so as to indicate the position of the latter when concealed within the pipe and facilitate the adjustment of said tube with the opening 14 at substantially the center of the pipe 8 and directly exposed to the action of the flow or current therein. A hollow or tubular valve stem 16 is detachably connected with the upper end of the tube 10, said valve stem being provided with a conical valve head 17 seating in a conical valve seat at the upper end of said tube, as best shown in Fig. 2. The valve stem 16 is detachably and adjustably secured in place by means of a coupling 18 swiveled on said valve stem behind said valve head and threaded to the upper end of said tube, as shown. A rubber tube or hose 19 is secured to the valve stem 16 and is provided with a branch 20 connected with one limb 21 of a glass U-tube, as shown. By this arrangement, it will be observed that the hose or tube 19 may be readily detached if desired, or loosened, so as to prevent the twisting thereof during connection of the casing 4 with the corporation cock 7. The U-tube is filled with a distinctively colored liquid 22, of known specific gravity heaver than water or the liquid flowing in the pipe 8, and which will not readily mix with water, and pinch cocks 23 are arranged on the tube 19 on opposite sides of the branch 20, as shown. The other limb 24 of the U-tube is connected by a branch 25 with another rubber hose or tube 26, leading to a nipple 27 having a passage 28 extending therethrough, and thence downwardly into the top of the chamber within the casing 4, pinch cocks 23 being provided on tube 26 on opposite sides of the branch 25, as indicated. The tube 26 is connected with the nipple 27 which extends laterally from the side of casing 4 by means of a valve stem 16, valve head 17 and coupling 18, just as the tube 19 is secured to the tube 10.

In use, the parts are connected as shown, and all tubes filled with water from the pipe 8 by manipulating the pinch cocks 23, whereupon the outer pinch cocks are closed. By this arrangement one limb 24 of the U-tube will be subjected to the action of the static pressure in the pipe 8, and the other limb 21 thereof will be subjected to the static pressure, and, in addition thereto, to the effect of the flow or velocity of any current within the pipe 8, which will necessarily force the level of the liquid 22 downwardly in the limb 21 and upwardly in the limb 24. The difference in level between the liquid in the limbs of the U-tube is then measured, and constitutes a means for calculating the velocity of flow of the current in pipe 8, a suitable co-efficient for the orifice 14 being determined by experiment and a proper co-efficient for the pipe 8 being assumed. In this way, the velocity of flow, and other features relating thereto, may be readily determined, as will be readily understood by those skilled in this art.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. The combination with a pipe, of a corporation cock leading thereinto; a casing provided with means for securing the same to said corporation cock and with an internal chamber arranged and adapted to be placed in open communication with the interior of said pipe upon opening of said cock; a lateral extension on said casing; said extension being provided with a passage leading from said chamber; a current-testing tube slidable in said casing and insertible into said pipe through said corporation cock; a U-tube; and means for connecting one limb of said U-tube with said current-testing tube, and the other limb with the lateral extension of said casing, substantially as described.

2. The combination with a pipe, of a corporation cock leading through the periphery thereof; a casing threaded to the outer end of said corporation cock, said casing being provided with an internal chamber arranged to be thrown into open communication with the interior of said pipe upon opening of said corporation cock and there being a laterally extending passage leading from said chamber out through a side of said casing; a current-testing tube slidable through said casing, chamber, and corporation cock, said tube being closed at its inner end and provided with a current opening; an indicator on the outer end of said tube indicating the position of said current opening; a laterally extending threaded nipple on said casing surrounding the passage leading from said chamber, said nipple being provided with a valve seat at the outer end of said passage; a perforated valve stem having a head adapted and arranged to seat on said valve seat; a coupling threaded on said nipple and swiveled on said valve stem, and arranged to force said valve head to its seat; a U-tube; a hose connected with said valve stem and with one limb of said U-tube; and a hose connected with the other limb of said U-tube and with the outer end of said current-testing tube substantially as described.

3. The combination with a pipe, of a corporation cock leading through the periphery thereof; a casing secured to the outer end of said corporation cock, said casing being provided with an internal chamber arranged to be thrown into open communication with the interior of said pipe upon opening of said corporation cock, and there being a laterally extending passage leading from said chamber out through a side of said casing; a current-testing tube slidable through said casing, chamber and corporation cock, said tube being closed at its inner end and provided with a current-opening; a laterally extending nipple on said casing surrounding the passage leading from said chamber; a U-tube; a hose connecting one limb of said U-tube with said nipple; and a hose connecting the other limb of said U-tube with the outer end of said current-testing tube, substantially as described.

In testimony whereof I have signed my name to this specification in the presence of two subscribing witnesses.

WILLIAM S. DARLEY.

Witnesses:
JOSHUA R. H. POTTS,
B. G. RICHARDS.